(12) United States Patent
Duta

(10) Patent No.: US 8,515,736 B1
(45) Date of Patent: Aug. 20, 2013

(54) TRAINING CALL ROUTING APPLICATIONS BY REUSING SEMANTICALLY-LABELED DATA COLLECTED FOR PRIOR APPLICATIONS

(75) Inventor: Nicolae Duta, Winchester, MA (US)

(73) Assignee: Nuance Communications, Inc., Burlington, MA (US)

( * ) Notice: Subject to any disclaimer, the term of this patent is extended or adjusted under 35 U.S.C. 154(b) by 349 days.

(21) Appl. No.: 12/894,752

(22) Filed: Sep. 30, 2010

(51) Int. Cl.
*G06F 17/27* (2006.01)

(52) U.S. Cl.
USPC .......................................................... 704/9

(58) Field of Classification Search
USPC .......................................................... 704/9
See application file for complete search history.

(56) References Cited

U.S. PATENT DOCUMENTS

| | | | |
|---|---|---|---|
| 2006/0080101 A1* | 4/2006 | Chotimongkol et al. | 704/257 |
| 2006/0149544 A1* | 7/2006 | Hakkani-Tur et al. | 704/236 |
| 2008/0071533 A1* | 3/2008 | Cave et al. | 704/235 |
| 2010/0235165 A1* | 9/2010 | Todhunter et al. | 704/9 |
| 2013/0035932 A1* | 2/2013 | Bangalore et al. | 704/9 |

* cited by examiner

*Primary Examiner* — Jakieda Jackson
(74) *Attorney, Agent, or Firm* — Chapin IP Law, LLC

(57) ABSTRACT

Techniques disclosed herein include systems and methods for reusing semantically-labeled data collected for previous or existing call routing applications. Such reuse of semantically-labeled utterances can be used for automating and accelerating application design as well as data transcription and labeling for new and future call routing applications. Such techniques include using a semantic database containing transcriptions and semantic labels for several call routing applications along with corresponding baseline routers trained for those applications. This semantic database can be used to derive a semantic similarity measure between any pair of utterances, such as transcribed sentences. A mathematical model predicts how semantically related two utterances are, such as by identifying a same user intent to identifying completely unrelated intents. Such a semantic similarity measure can be used for various tasks including semantic-based example selection for language model and router training, and semantic data clustering for semi-automated labeling.

23 Claims, 13 Drawing Sheets

500 ↘

| 502 | 504 |
|---|---|
| need to talk to someone about my bill | BillingAndPaymentsDis |
| i'd like to talk to someone about my bill | BillExplanation |
| return d_s_l modem | DisconnectDis |
| d_s_l modem return | InternetDis |
| need r_m_a number | DisconnectDis |
| need r_m_a number to return my modem | Sales |
| due date | BillExplanation |
| payment due date | AccountBalance |
| pay my bill later than the due date | DisconnectDis |

| 602 | 604 |
|---|---|
| i need to talk to an agent please<br>speak with an operator<br>wanna talk to somebody now<br>service representative please<br>i would like to speak to somebody in a customer service<br>i need live agent | unknown charges<br>unknown charge<br>reverse charge<br>verify charge<br>verify a charge<br>statement charges<br>charge on statement<br>unknown charge on my statement |
| 606 | 608 |
| atm card not work<br>Card not working<br>card not working<br>Card is not working<br>check card not working<br>atm card won't work | inquire about account<br>I wanna know about my account<br>calling about my account<br>about my account<br>need to talk about account<br>I'd like to talk about my account |

*FIG. 6*

TRAINING CALL ROUTING APPLICATIONS BY REUSING SEMANTICALLY-LABELED DATA COLLECTED FOR PRIOR APPLICATIONS

BACKGROUND

The present disclosure relates to natural language understanding and text classification. The present disclosure also relates to the training of semantic classification applications that can be used with call routers and voice-activated or voice-controlled systems.

Spoken language understanding systems have been deployed in numerous applications that involve interaction between humans and machines. Such systems typically operate by processing spoken utterances from a human to identify intended meaning of questions or answers uttered by the human. By correctly identifying an intended meaning of a spoken utterance, the system can execute various actions in response to that utterance, for use with various applications. For example, such actions can include performing mechanical operations, operating a computer, controlling a car audio/navigation system, or routing a telephone call to an appropriate area or agent.

One particular class of applications employs Natural Language Understanding (NLU) technology as a type of semantic classification known as "call routing." Call routing applications involve semantically classifying a telephone query or statement from a caller to route the telephone call to an appropriate agent or location within the call routing system. Such routing, for example, can be based on a brief spoken description of the caller's reason for the telephone call. Call routing systems reduce queue time and call duration, thereby saving money and improving customer satisfaction by promptly connecting a given caller to a correct service representative, such as in large call centers.

Call routing applications classify spoken inputs or utterances into a small set of categories for a particular application. For example, the spoken inputs, "I have a problem with my bill," "Check my balance," and "Did you get my payment?" might all be mapped to a "Billing" category, or each might be mapped to one of several subcategories within a broader billing category. Since people express spoken requests and queries in many different ways, call routers are typically implemented as a statistical classifier that is trained on a labeled set of spoken requests and their corresponding classifications.

Determining a semantic classification for a human utterance in a call routing system is typically a five-step process as illustrated the online recognition process 110 of FIG. 1. Input speech 107 from a speaker 106 is translated into a text string by an automated speech recognition (ASR) module 112. This text string generated by the ASR module 112 is output into an NLU semantic classification component known as a statistical router 114. The statistical router 114 models the task of natural language understanding as a statistical classification problem in which the text string corresponding to the human utterance is assigned to one or more of a set of predefined user intents, referred to as "call routes," as part of a route ordering/reordering process (117). The route ordering process can also receive a confidence level of assigned routes using confidence engine 115. Then the recognition process can execute a routing decision (119). The routing decision can be based on thresholds corresponding to confidence levels of assigned routes. Various specific classifiers can have high levels of classification accuracy.

Creating a new call routing application is a training process. Typically, a new set of training utterances is initially developed based on specific needs of the new application, or needs of an entity requesting the new call routing application. FIG. 2 shows this process generally. A training corpus 201 contains examples of sample training utterances 202 which are labeled with associated router classification tags 203. A feature set in the training corpus 201 is selected (e.g., words in the sample training utterances 202) which together with a classification model 205 (e.g., neural network) can be used to build and train a call routing semantic classifier 204 for the application.

This training process is an expensive process because a large labeled training corpus 201 must be collected and developed for each new application to create an application with acceptable classification accuracy. Such collection and development is usually a manual process. This collection and development process (offline training process 120) involves human/manual transcription 122 or human-reviewed transcription of a set of recorded utterances 127, such as recorded queries from calls received at a particular call center. The human transcriber/reviewer then annotates recorded utterances with their semantic classes to create a set of semantic labels 125. That is, the human transcriber identifies what was said, and what class to assign. After offline training of the call routing classifier 204 on the training corpus 201, the call routing classifier 204 can be implemented in the application to process live, unlabeled, incoming utterances from real callers of an online call routing application.

SUMMARY

Text classification (semantic classification) can be used in many practical applications, such as spoken dialog systems, spam or adult material filtering, email and web-page categorization, document (news stories, academic papers, healthcare reports) indexing, and telephone call routing. The task of classifying text is conventionally regarded as a supervised learning problem in which inductive models (e.g. Naïve Bayes, Support Vector Machines, Boosting, MaxEnt) are trained from manually-labeled data. Manually labeling large training sets of data, however, is expensive, time consuming, tedious and prone to labeling inconsistencies.

Techniques disclosed herein include systems and methods for text classifier design and training. One text classification task is that of assigning a user intent to short requests that people utter in response to an open-ended query, such as a "How may I help you" prompt when calling into a call center. "Call routing" is a class of applications that can employ Natural Language Understanding (NLU) technology. NLU technology, applied to call routing applications, is designed to automatically route a telephone query from a customer to an appropriate agent, or set of agents, based on a brief spoken description of a problem or issue.

To find the meaning of a human utterance in a call routing system, the caller's speech is first translated into a text string by an Automated Speech Recognition (ASR) system and the text is then fed into a NLU component called a statistical router. The natural language understanding task is modeled as a statistical classification problem. That is, text corresponding to an utterance is assigned to one or more of a set of predefined user intents (routes). One of several classifiers (boosting, Maximum Entropy, Support Vector Machines (SVM)) can be selected for use, each with high classification accuracy. One particular router with high accuracy uses binary unigram features and a standard back-propagation neural network as a classifier.

Different call routing applications have different semantic classifiers based on their own specific needs, or rather needs specified by a customer/developer of a given call routing application. Even within similar domains or industries there are significant differences among call routing applications, and thus there is no simple method of reusing training data from previously-trained call routing applications. For example, semantic labeling structures among call routing applications differ in amount of labels, names of labels, hierarchal structure, number of subclass levels, and so forth. In a more specific example, a given call service center may have just a few call service agents, while another call service center has hundreds or thousands of call service agents. In a relatively small call service center, a particular service representative may handle all calls related to billing, while in a relatively large call service center there may be many service representatives, each of whom handles only specific types of billing questions. Thus, each call service center can impose its own set of classes, and these classes can differ in many ways from classes created by other call service centers.

Creating and training new call routing applications is time-consuming because of the manual transcription and semantic annotation involved. In one process, training a call routing application uses two sets of manual annotations of user-spoken utterances. The first set of annotations, called transcriptions, denote text corresponding to spoken waveforms, and is used to train a Language Model (LM) used in the ASR system as well as training the Router. The second set of annotations (labels), concerns a user's intent, and is used to train the Router. A given new call routing application can be designed to handle about 10-1000 user intents (or more), and uses 10,000 to 100,000 utterances (or more) to manually transcribe and annotate for training a new semantic classifier. Such manual training can take from several weeks to several months to complete. It is desirable to reuse training data from existing call routing applications, but reuse is challenging because of differences among existing call routing applications. For example, semantic labels (user intents) are usually application specific and often suggested by a customer/user of a given application. Thus, two applications in the same domain (e.g. telecommunications) whose training data overlap to a large degree may end up with substantially different sets of semantic (intent) labels. As such, previously labeled training data cannot be directly reused to build a new application—even for domains where sufficient in-domain data has already been collected. Another challenge is inconsistency in annotations. When multiple different transcribers annotate manually, the resulting semantic labels can be inconsistent. Even identical utterances can be classified differently depending on the transcriber.

Techniques disclosed herein include systems and methods for reusing semantically-labeled data collected for previous or existing call routing applications. Such reuse of semantically-labeled utterances can be used for automating and accelerating application design as well as data transcription and labeling for new and future call routing applications. Such techniques include using a semantic database containing transcriptions and semantic labels for several call routing applications along with corresponding baseline routers trained for those applications. This semantic database can be used to derive a semantic similarity measure between any pair of utterances, such as (manually or automatically) transcribed sentences. A mathematical model predicts how semantically related two utterances are, such as by identifying a same user intent to identifying completely unrelated intents. If compared utterances are specific to specific domain(s) present (or related to those) in the database, then the semantic similarity prediction is very accurate.

Such a semantic similarity measure can be used for various tasks including semantic-based example selection for language model and router training, and semantic data clustering for semi-automated labeling.

The task of semantic-based example selection involves methods for training statistical language models (SLM) and statistical semantic models (SSM) based on reusing language and semantic data collected for previous call routing applications. These methods can use both semantically-labeled and non-labeled data grouped into a semantic database, along with previously-trained semantic classifiers. For example, a new or untrained call routing application begins training with relatively little data collection, that is, a relatively small set of example utterances for each given class. These few collected sample utterances are used as queries in the semantic database to generate more semantically similar examples for training SLMs and SSMs. Semantic similarity refers to a measure or degree of likelihood that a specific query comes from a same semantic class as a selected set of examples.

The task of semantic data clustering and semi-automated labeling involves semantically clustering or grouping a set of utterances from a new call routing application to assist a person/transcriber with modeling and designing call routes and classes, and also with the process of labeling utterances. Such assistance accelerates the modeling/labeling process and reduces or eliminates transcriber inconsistencies. Such clustering can be based on a semantic distance computed according to a database of prior call routing applications. For example, a clustering algorithm can be a hierarchical "complete linkage" algorithm, which aims at minimizing a cluster diameter, that is, maximizing the semantic similarity between sample utterances in a same cluster. The clustering process can be stopped when the intra-cluster similarity reaches a lower-bound threshold. Each cluster can be labeled by a most frequent label of clustered utterances according to any included database routers. A resulting set of clusters can be presented to a manual transcriber as a suggestion of how data can be grouped together based on its meaning. The transcriber then only needs to join/split a small number of clusters in order to obtain a custom data labeling.

The result of such example selection and data clustering results in techniques that are cost and time-effective for deploying a new call routing application by decreasing the cost of manual annotation of the audio data, and by decreasing the amount of manual work required, thereby implicitly reducing development time for faster deployment.

In embodiments described herein, a database of utterances collected and labeled for prior call routing applications can be accessed. Each prior call routing application can include a call router trained from its corresponding set of training utterances. A baseline accuracy number estimated by executing or running these prior routers on an independent test set, along with a route confusion matrix, can be ascertained for each prior application.

In one embodiment, a scientist/technician developing a new application receives a small set (for example, 1-4 utterances for each semantic class) of manually-transcribed and semantically-labeled utterances (according to the new application set of semantic labels). For each such utterance, the scientist searches the database of utterances and extracts several utterances that have a meaning similar to the given utterance. The utterances extracted from the database are used to augment a training set for the new application.

To find semantically similar utterances, a semantic distance is computed between each given target utterance and utterances present in the database. Then, the database utterances with the smallest semantic distance are returned or identified. The semantic distance is calculated by feeding or inputting the target utterance to each of the database routers and fusing the information returned by the routers (for example, the top 3 routes along their classification confidence) with the prior accuracy numbers. A level of confidence identifies a probability that the target utterance has been correctly labeled.

In one embodiment, a training manager, for a call routing application, receives a first utterance for use in training a first automatic semantic classifier. This first automatic semantic classifier is associated with a set of manually-created semantic classes for labeling transcribed utterances. These semantic classes can be part of a hierarchy of categories used to identify meanings of utterances. The first utterance can be a transcribed utterance manually classified in a first semantic class within the set of manually-created semantic classes. Alternatively, the first utterance has been automatically classified in the first semantic class. The training manager then semantically labels the first utterance using a second automatic semantic classifier. This second automatic semantic classifier is a previously-trained semantic classifier. Thus, the training manager uses the second automatic semantic classifier to analyze the first utterance and classify the first utterance using existing training of the second automatic semantic classifier.

The training manager then semantically labels existing utterances using the second automatic semantic classifier. These existing utterances are accessed from a database of existing utterances. This database of existing utterances contains transcribed utterances used to train previously-trained automatic semantic classifiers. The training manager can then identify existing utterances that are semantically similar to the first utterance based on semantic labeling from the second automatic classifier. The training manager identifies the semantically similar existing utterances for training the first automatic semantic classifier.

The training manager can also semantically label the first utterance using multiple automatic semantic classifiers. The multiple automatic semantic classifiers are previously-trained semantic classifiers, such as used as part of existing or previous call routing applications. Each of the multiple automatic semantic classifiers separately labels the first utterance. The training manager semantically labels the existing utterances using the multiple automatic semantic classifiers. Each of the multiple automatic semantic classifiers separately labels the existing utterances as with the first or sample utterance. The training manager can associate a level of confidence with each applied semantic label. This level of confidence identifies a probability that a given utterance has been correctly labeled. Such association can include identifying existing utterances that have a computed level of confidence within a predetermined threshold associated with the first utterance.

In another embodiment, the training manager process, or application scientist, receives a set of utterances for training a given (new or untrained) automatic semantic classifier. This set of utterances can be manually or automatically transcribed utterances. The training manager semantically labels utterances from the set of utterances using multiple previously-trained automatic semantic classifiers. That is, the training manager uses the previously-trained automatic semantic classifiers to analyze utterances and execute semantic classification using each utterance of the set of utterances. The training manager identifies semantically labeled utterances that are semantically similar, and then groups utterances from the semantically labeled utterances into one or more sets of utterances. Such grouping is based on a measure of semantic similarity between pairs of semantically labeled utterances. The training manager then presents a set of semantically grouped utterances, along with one or more available semantic labels, for manual selection of an available semantic label to classify the set of semantically grouped utterances. For example, such a display of grouped utterances can be used as part of a process for developing or creating a set of semantic classes appropriate for a specific implementation or call center.

The training manager can also semantically label utterances by associating a level of confidence with each applied semantic label. This level of confidence identifies a probability that a given utterance has been correctly labeled. Each utterance can receive one or more pairings of a semantic label and level of confidence. Associating the level of confidence with each applied semantic label can include applying both a level of confidence automatically generated, and a level of confidence manually identified and associated with semantic labeling. The automatically generated level of confidence can be generated by a respective previously-trained automatic semantic classifier, and the manually identified level of confidence can be identified from the respective previously-trained automatic semantic classifier. When grouping utterances, the training manager can create a hierarchy of groups structured for selecting various degrees of overlap among semantically labeled utterances.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving a first utterance for use in training a first automatic semantic classifier, the first automatic semantic classifier having a set of manually-created semantic classes for labeling transcribed utterances, the first utterance being a transcribed utterance manually classified in a first semantic class within the set of manually-created semantic classes; semantically labeling the first utterance using a second automatic semantic classifier, the second automatic semantic classifier being a previously-trained semantic classifier; semantically labeling existing utterances using the second automatic semantic classifier, the existing utterances accessed from a database of existing utterances, the database of existing utterances containing transcribed utterances used to train previously-trained automatic semantic classifiers; and identifying existing utterances that are semantically similar to the first utterance based on semantic labeling from the second automatic classifier, the semantically similar existing utterances being identified for training the first automatic semantic classifier. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Nuance Communications Inc., Burlington, Mass., USA.

As discussed above, techniques herein are well suited for use in software applications supporting call routing applications. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 5 is a table showing example confusable routes of a call routing application.

FIG. 6 is a table showing example semantic clustering results according to embodiments herein.

DETAILED DESCRIPTION

Figure 1:
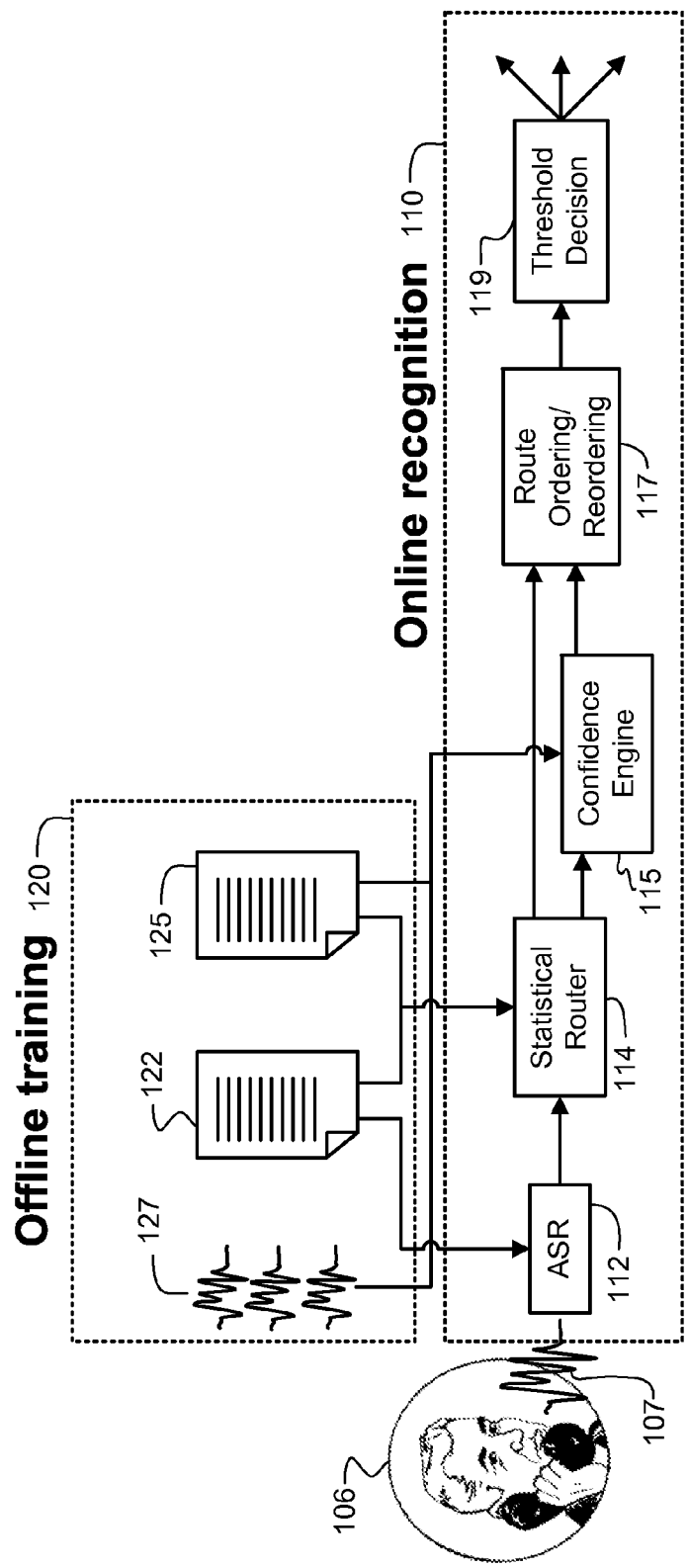
FIG. 1 is a block diagram illustrating a typical semantic classification system in the specific form of a call router application.
Figure 2:
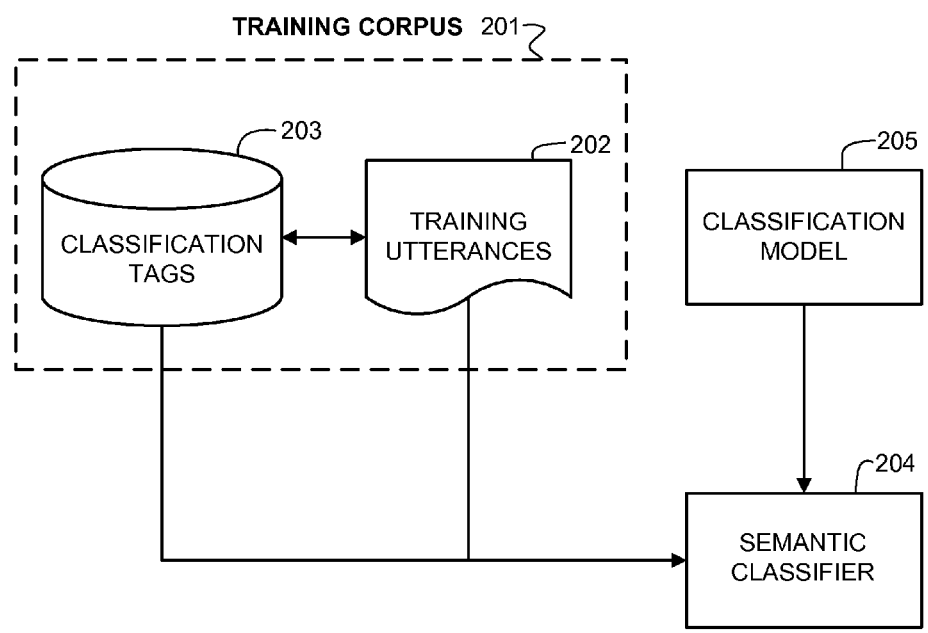
FIG. 2 is a block diagram showing an example development of a new call routing classification system from a training corpus.
Figure 3:
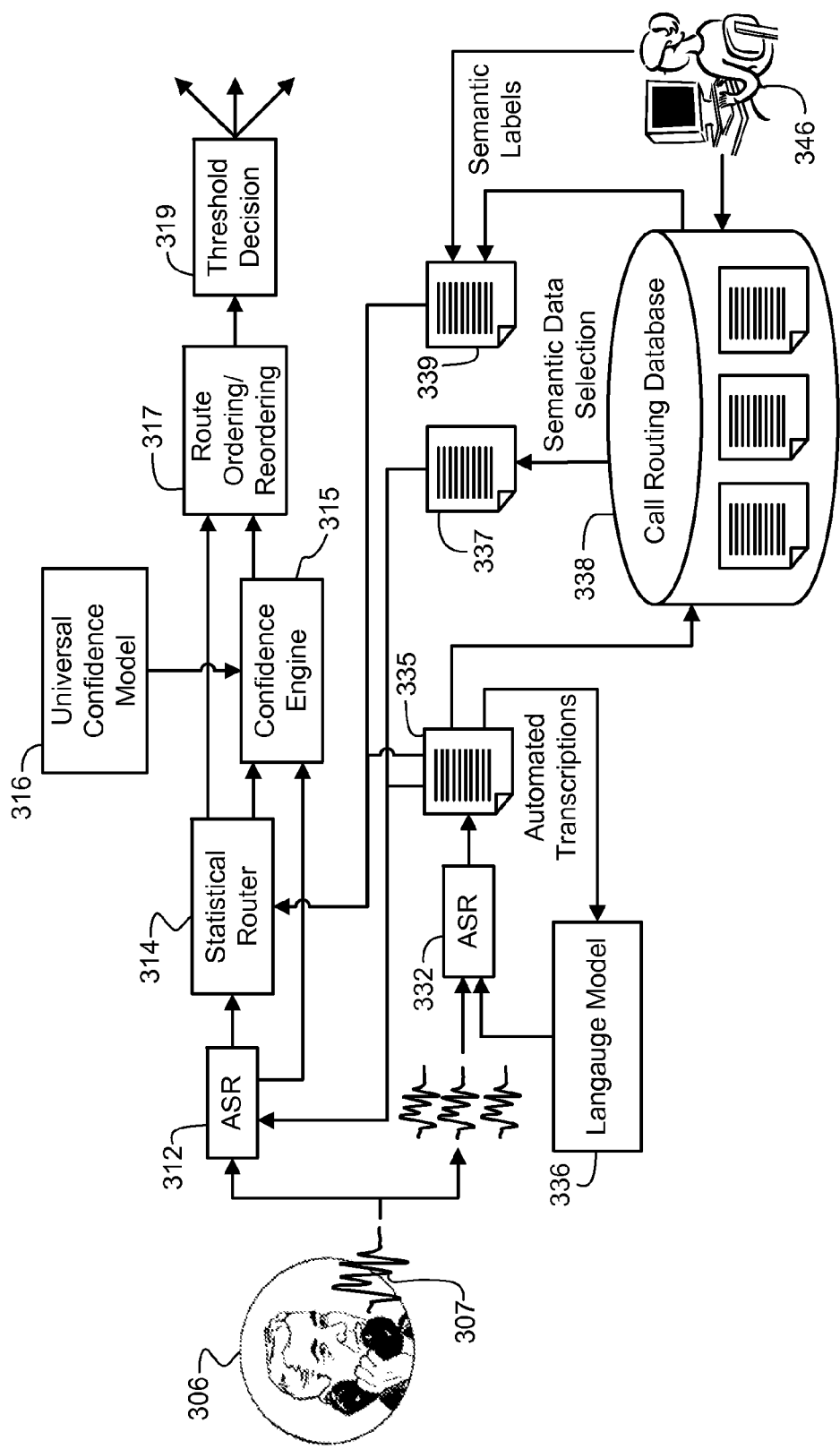
FIG. 3 is a block diagram showing an active learning-based call routing system according to embodiments herein.

Techniques disclosed herein include systems and methods for text classification that includes a sentence-level semantic similarity derived from output of a set of text classifiers trained on manually-labeled data. The systems and methods also include a method of augmenting a small, manually-labeled training set for a new text classification application with semantically similar samples selected from a database of utterances collected for prior applications. The systems and methods also include a method for suggesting sets of semantic labels (user intents) when designing a new application. Such methods disclosed herein capture true semantic similarity of sentences that have different wording but a same meaning.

Techniques disclosed herein include systems and methods for reusing semantically-labeled data collected for use with previous or existing call routing applications, by extracting semantically similar examples from a database of utterances based on previous classifications of those examples. Such reuse of semantically-labeled utterances can be used for automating and accelerating application design as well as data transcription and labeling for new and future call routing applications, and for re-training existing applications. Such techniques include using a semantic database containing transcriptions and semantic labels for several call routing applications along with corresponding baseline routers trained for those applications. This semantic database can be used to derive a semantic similarity measure between any pair of utterances, such as transcribed sentences (user requests to an automated call routing system). A mathematical model predicts how semantically related two utterances are (a degree to which tow utterances are semantically similar), such as by identifying a same user intent or identifying completely unrelated intents. Such a semantic similarity measure can be used for various tasks including semantic-based example selection for language model and router training, and semantic data clustering for semi-automated labeling.

Techniques disclosed herein provide a training manager process/system that can reduce data collection for statistical language model (SLM) and statistical semantic model (SSM) applications by using pre-existing data sources. The training manager enables broad adoption of SLMs in directed dialogs. The training manager identifies old or previous queries for use as stand-in training data, and then builds a semantic database containing sentences or transcribed utterances used to train routers in previous call routing applications. The training manager can operate with various data sources or combinations of data sources. Such data sources can include manual transcriptions of audio data, automated transcriptions of audio data, web-crawled text data, and human knowledge present in manually-built grammars. Manual transcriptions can come from in-domain sources, out-of-domain sources, vertical sources (prior applications), and general conversation data.

In general, semantic-based example selection for language model and router training involves database creation, example selection, and example cleaning With respect to database creation, the training manager builds a semantic database from a set of text utterances (which can be manually transcribed) as well as a set of semantic classifiers (routers) used in call routing applications. The training manager runs each database utterance through the semantic classifiers and retains the N-best classes and their confidences. With respect to example utterance selection, each manually transcribed and labeled utterance of a new application (query) is run through database semantic classifiers and the N-best classes and their confidences are retained. For each query, the training manager computes its semantic similarity to all database examples, and the database samples with sufficiently high similarity are reported. With respect to example cleaning, the automatically selected samples can be manually cleaned by removing those results that appear inappropriate or inaccurate for their semantic class.

Such techniques provide advantages over conventional training processes. For example, a given new call routing application might use 100,000 total example utterances for accurate training. Each of these 100,000 example utterances is manually transcribed and manually annotated into classes such that there are hundreds of manually-annotated examples per class. With the training manager, only one or only a few example utterances are manually-annotated, and the training manager uses these few example utterances to query a database of existing utterances to extract relatively many different ways of saying the same thing, that is many additional example utterances that are semantically similar to the initial example utterances.

Regarding semantic data clustering for semi-automated labeling, the training manager can reduce data collection and annotation time and efforts for statistical language models (SLMs) and statistical semantic models (SSMs) for call routing applications by reusing pre-existing data sources. Such reuse decreases application deployment time and amount of manual labor necessary for deployment. The training manager can automatically suggest semantic labels for a new call routing application.

In general, the training manager operates by semantically clustering a set of utterances from a new application to assist a person/transcriber/developer with modeling routes and with the process of labeling utterances. Such assistance accelerates the modeling/labeling process, and eliminates some transcriber inconsistencies. The clustering can be based on a semantic distance computed according to a database of prior call routing applications. The training manager can use a clustering algorithm that is a hierarchical "complete linkage," which aims at minimizing the cluster diameter. That is, the algorithm aims at maximizing a semantic similarity between samples in a same cluster. The clustering process can be completed when an intra-cluster similarity reaches a lower-bound threshold or other trigger. Each cluster can be labeled by a most frequent label applied by any of the database routers/semantic classifiers analyzing utterances within that cluster. The training manager can then present the clusters to the manual transcriber as a suggestion of how data can be grouped together based on its meaning. Such cluster presentation can result in minimal cleaning by a transcriber with only a relatively small number of clusters to join or split to obtain a custom data labeling.

Now more specifically, the training manager can operate by determining sentence-level similarity. A given number of N text classifiers $(Class_i)_{i=1:n}$ are accessed along with their corresponding training sets, independent test sets, and baseline precision numbers. The training manager does not need to make any assumptions about sets of classes (semantic labels or intents) returned by the classifiers. Each classifier can have its own set of classes, of different cardinality and/or semantic granularity, different labeling guidelines, etc. The training manager computes an empiric baseline precision by running each classifier on its independent test set. This can be presented as vector $P^a_i(c_j)$=Frequency of class $c_j$ being correct whenever assigned by $Class_i$. Each classifier, when being tested on a sample e, can output a number of top classes along with their classification confidences. For example, $Conf_i(c|e)$ =confidence of test sample e being classified as class c.

The training manager combines the two pieces of information (prior precision and run-time classification confidence) into a single posterior probability that $Class_i$ correctly classifies sample e into class c:

$$P^{post}_i(C_i(e) = c) = P^a_i(c) * Conf_i(c\,|\,e) \Big/ \sum_{c'} P^a_i(c') * Conf_i(c'\,|\,e)$$

The training manager then defines the posterior probability that samples e and e' are correctly classified by Class, into the same class:

$$P^{post}_i(C_i(e) = C_i(e')) = \sum_c sqrt(P^{post}_i(C_i(e) = c) * P^{post}_i(C_i(e') = c))$$

Finally, the training manager defines semantic similarity between samples e and e' as the posterior probability that they are assigned the same joint label by multiple classifiers:

$$\text{Semantic\_similarity}(e, e') = \prod_i P^{post}_i(C_i(e) = C_i(e'))$$

The database classifiers $Class_i$ can operate independently, thus the probability of assigning the same joint label is equal to the product of the probabilities of each classifier assigning the same label. The semantic similarity function has the following properties: (1) $0 <= S\_S(e,e') <= 1$; (2) $S\_S(e,e)=1$; and (3) $S\_S(e,e')=S\_S(e',e)$ (symmetry). The training sentences for the classifiers $(Class_i)_{i=1:n}$ along with any unlabeled data from similar applications can be set up as a database of sentences from which semantically similar examples can be retrieved.

The training manager uses the semantic similarity function, defined above, to search a sentence database and collect samples, which are semantically similar to a given query. The semantic-based example selection algorithm can include several steps. In one step the training manager labels the sentence database, using classifiers available, to produce joint label and classification confidences. By way of a non-limiting example, an example training sentence is "speak Spanish." In this example, this training sentence was a training sentence used for only one of three particular classifiers. By analyzing this training sentence using these three particular classifiers, the training manager might receive these example results: [SpanishApp/0.97; OOV/1; Unknown/0.96]. In these results, OOV denotes an Out-of-Vocabulary label (the sentence is outside the operating domain for the classifier), and "Unknown" denotes a reject route. In other words, the training manager runs the training sentence through all three classifies and receives a label from only one of the classifiers. In another step, the training manager labels the query sentences collected for a new application using classifiers available. For example, the query "Espanol" might produce the result: [SpanishApp/1; OOV/1; OOV/1].

For each query and database sentence, the training manager computes a semantic similarity, and returns database sentences with a highest similarity. For example, for the query "Espanol," the most semantically similar sentences in the database might be: "is there anyone that talks in spanish"/0.00019677; "do you have someone who speaks Spanish there"/0.00019574; and "excuse me somebody speaks spanish"/0.0001909. The quality of selected examples largely depends on whether the database contains sentences with exactly the same meaning as the given query. That is usually the case if at least one classifier from the same activity domain (vertical industry) is part of the database. For example, the query "account balance" returns: "the balance on my account," "check my account balance," "balance of my phone bill," "contract balance," "what's my balance," "how much do I owe you," "current balance please," etc. Note that the sentences returned do not necessarily belong to the same application or even to applications from the same domain. There can be a subset of user intents that overlap across applications from different domains (e.g. account related queries are common to most applications/industries).

If a given query meaning is not exactly represented but is related to some meaning in the database, then the training manager can still extract some useful sentences, albeit of a lower quality. For example, the query "need to talk to a pharmacist," might return database sentences such as: "connect me to a operator," "speak to a live rep," "could I talk to a person," and "can I speak to somebody." Note that these example result sentences do not relate specifically to pharmacology, but have a similar meaning. In another example, the query "order forms" returns database sentences such as: "form for low income" and "I wanna place an order, order pamphlets." Note that these results sentences/utterances are not very similar. In another example, the query "transfer prescription" returns database sentences such as: "moving into a new address," and "a transfer of service." Likewise, these example results do not have exactly the same meaning but can still be useful for training purposes. Thus, if a corresponding query meaning is not present in the database, then all database sentence results have a low semantic similarity.

The training manager can be configured with thresholds for similarity values, below which no example is returned or accepted. For example, the query "participating pharmacies" might return nothing when no medical domain classifier is part of the database. Nevertheless, even when there are database sentences with similarity values above a threshold, meanings tied to these database sentences may be different from the query meaning. For example, the query "special request" returns: "a medical form," "applying for form," and "times you're open." This result might happen if some database classifiers assign a high confidence reject or OOV label to both the query and the returned sentences. In order to alleviate this issue, the training manager can set the run-time confidences for the reject/OOV labels to 0 in all database classifiers. The training manager can also drop or exclude from the similarity computation equation, one third of classifiers with the lowest $$P_i^{post}(C_i(e) = C_i(e'))$$

to acknowledge that database classifiers come from different domains, and each database classifier has limited knowledge on out-of-domain sentences.

Using this semantic-based example selection technique, the training manager can transform an offline trained call routing system into an active learning system. Such an active learning system does not require manual transcription of data because its statistical language model can be automatically trained. For example, the training manager can use systems and methods described in "Transcription-less Call Routing using Unsupervised Language Model Adaptation", in Proc. Interspeech Conf., Brisbane, Australia, 2008, which is herein incorporated by reference in its entirety. Additionally, the active learning system does not require a custom-trained routing confidence model because an application independent model can be trained. For example, the training manager can use systems and methods as described in U.S. Patent Application Publication Number 2010/0023331, entitled "Speech recognition semantic classification training" The training manager can thus function with a set of semantic labels and a relatively limited amount of manually-labeled utterances.

FIG. 1 illustrates an active learning-based call routing system according to embodiments herein. Input speech 307 from speaker 306 is recorded for training purposes. Such speech can be recorded, for example, from calls to a specific call center. Automated speech recognition module 332 can generate automated transcriptions 335 using language model 336. An operator or technician/scientist 346 can create a set of semantic labels 339, such as for a specific call routing application. The training manager uses call routing database 338 to generate labeled utterances/sentences 337. Semantically labeled sentences can be both labeled pre-existing training data, and new labeled training data such as from transcriptions 335.

The training manager then identifies semantically similar utterances from the pre-existing utterances to augment new training utterances for use with new semantic labels 339 for active training of the natural language understanding system. The training manager uses the augmented set of semantically labeled training utterances for training a new application, including training automated speech recognition module 312 and statistical router 314. A universal confidence model 316 can also be updated or created with the augmented set of training utterances and manual input based on prior knowledge, such that confidence engine 315 operates with high accuracy. With the system actively trained, route ordering/reordering module 317 can function with a high degree of accuracy so that call routing decision module 319 can execute accurate decisions at launch time of a corresponding call routing application.

In one embodiment, the training manager receives semantic labels (routes) and a few sentences for each meaning. The number of sentences for each meaning can be as little as 1-4 sentences per semantic label. Note that sentences include any word or string/unit of words such as an expression in natural language. The semantic labels can be received from a customer or other developer of a given text classification application. The training manager then searches one or more sentence databases for more queries to supplement the manually-labeled set of queries. If multiple manually-labeled sentences are available for a semantic label, the training manager can use the most frequent transcription(s) when searching the database. Examples selected can optionally be manually edited and inspected. Such editing and inspection can be beneficial for applications where the database does not contain any vertical application. The training manager then trains the SLM and Router. If un-transcribed audio is available, the training manager can also use automated transcriptions in the SLM.

In another embodiment, the training manager labels sentences from a first group of sentences. The training manager uses multiple different text classifiers to produce a label and produce a classification confidence corresponding to the produced label. This results in a joint label. In other words, each of the multiple different text classifiers produces a respective label and classification pairing for each respective sentence from the first group of sentences. This first group of sentences can include sentences collected from sample sentences used for training existing text classifiers used with speech recognition applications. This existing text classifiers may or may not be currently used, with their corresponding voice-controlled applications, but they have been trained.

The training manager also labels sentences from a second group of sentences using the multiple different text classifiers. This produces a label and produces a classification confidence corresponding to the produced label. Each of the multiple different text classifiers produces a respective label and classification pairing for each respective sentence from the second group of sentences. In other words, each sentence is run through each text classifier to receive a joint label and confidence to collect a joint label and confidence from each text classifier. The second group of sentences includes sentences collected from sample training sentences for training a new or un-trained text classifier used with a speech recognition application.

The training manager computes a semantic similarity for each labeled sentence from the second group of sentences as compared to each labeled sentence from the first group of sentences. The training manager identifies labeled sentences from the first group of sentences that meet a predetermined measure of similarity to each given labeled sentence from the second group of sentences. In other words, after all sentences are compared with each other for similarity, the training manager identifies sentences that are sufficiently similar for accurately training a natural language understanding application.

The training manager can additionally group identified labeled sentences from the first group of sentences with corresponding sentences from the second group of sentences based on the predetermined measure of similarity, to thereby augment a training data set. Using identified labeled sentences from the first group of sentences and sentences from a second group of sentences, the training manager can then train the new text classifier used with the speech recognition application, such as a speech recognition application that is a call routing application.

In another embodiment, the training manager receives a first set of semantic labels. The training manager also receives a first set of sentences that includes at least one sample sentence for each semantic label from the first set of semantic labels. Thus, a few sample sentences can be received for each semantic label. The training manager creates a database of sentences that includes sentences used as training sentences to train text classifiers used with speech recognition applications. These sentences can be accessed from any application domain such as telecommunications, medicine, insurance, consumer goods, utilities, etc. The training manager identifies multiple different text classifiers trained for classifying text as part of speech recognition applications. Each of the multiple different text classifiers, when executed with a given input sentence, produces a classification label and corresponding classification confidence of the produced classification label for the given input sentence. Thus each text classifier can analyze a given sentence and return a semantic classification and confidence of that semantic classification. Note that different text classifiers can use different names for assigned labels according to their prior training and corresponding set of semantic labels.

The training manager labels sentences from the database of sentences using the multiple different text classifiers, wherein each of the multiple different text classifiers produces a respective label and classification pairing for each respective sentence from the database of sentences. The training manager also labels sentences from the first set of sentences using the multiple different text classifiers so that each of the multiple different text classifiers produces a respective label and classification pairing for each respective sentence from the first set of sentences. The training manager computes a semantic similarity for each labeled sentence from the first group of sentences as compared to each labeled sentence from the database of sentences. For each labeled sentence from the first set of sentences, the training manager identifies labeled sentences from the database of sentences that meet a predetermined measure of similarity, such as by reference a specific threshold. The training manager adds the identified labeled sentences from the database of sentences as sample sentences to the first set of sentences according to the computed semantic similarity and the first set of semantic labels, thereby augmenting a set of training sentences. The training manager can then use the identified labeled sentences from the database of sentences and the first set of sentences to train a statistical language model according to the first set of semantic labels. That is, the system now has relatively many sample sentences for each semantic label from a new application.

In other embodiments, the training manager can be used for semantic clustering or grouping to suggest labeling classes and mappings on call routing training sets. Typically, a portion of labels, assigned by human labelers, is inconsistent. Indeed, there can be substantial vagueness and overlap in a manner that semantics for each category are designed. This is at least due to the reality that judgments of meaning are more or less subjective. Thus, manually labeled data sets can be inconsistently labeled.

Another challenge with call routing applications is that a specific set of semantic labels and labeling guidelines are typically designed before any significant data analysis has taken place. It is common that the specific set of semantic labels reflect a customer's deployment requirements rather than true semantic categories present within corresponding data. FIG. 5 includes table 500 that provides an example of how confusable routes can increate annotator inconsistency. Column 502 lists various example customer requests, such as spoken request made via a call system. Column 504 lists potential corresponding manual labels. Note that the first two requests ("need to talk to someone about my bill" and "I'd like to talk to someone about my bill") have the same meaning, yet one manual annotation assigns a semantic class to route to "Billing and Payment Disambiguation," while a separate manual annotation routes this to "Bill Explanation." In another example, there are two requests to return a DSL modem, with one being classified as "Disconnect Disambiguation" while the other is classified as "Internet Disambiguation." In both requests is the customer wants to return a modem, but only one request was accurately annotated. In another example, a request for a payment due date was both annotated for "Bill Explanation" and for "Account Balance." Thus the process of designing semantic categories and routes can be prone to error.

As a solution, the training manager can extract semantic categories present within a given data set in lieu of imposing semantic categories. The sentence-based semantic similarity previously derived (described above) can be used to cluster data collected in a new application before any manual transcription or labeling work needs to be done.

Figure 4:
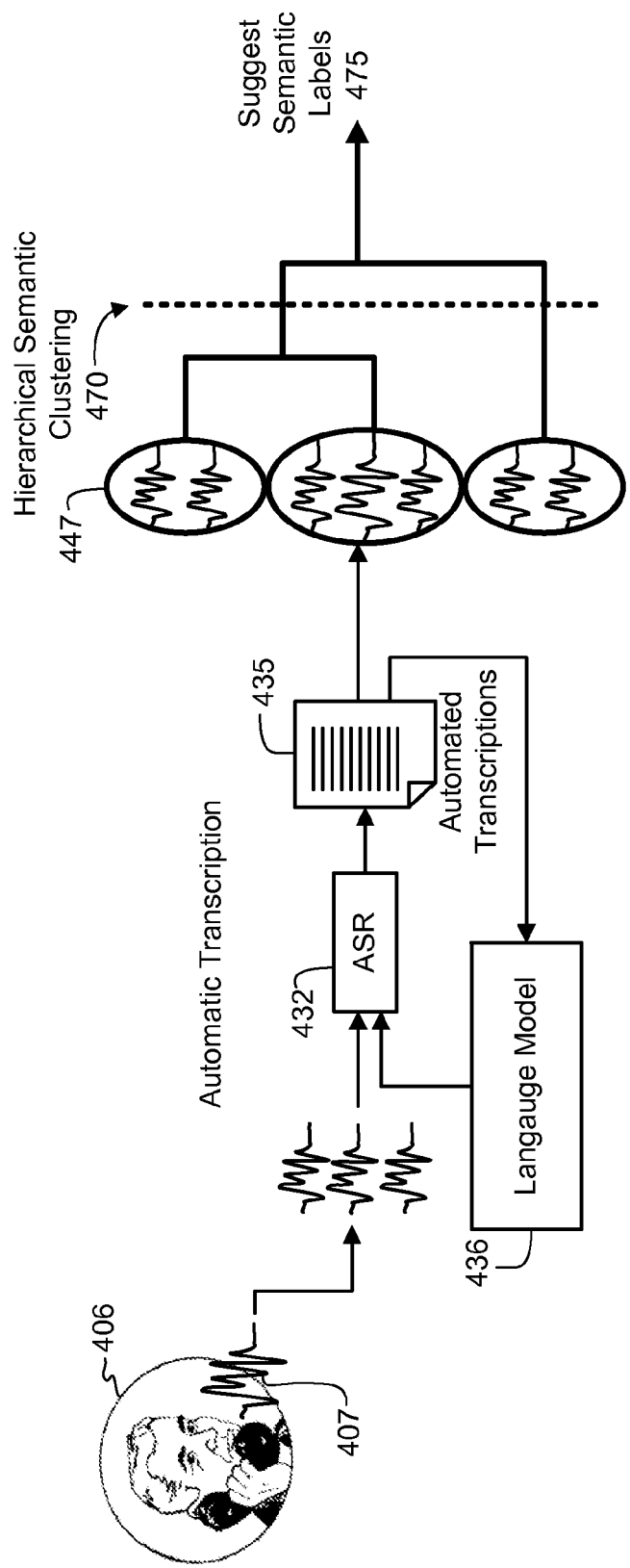
FIG. 4 is block diagram showing semantic clustering to suggest labeling classes and mappings on call routing training sets according to embodiments herein.

FIG. 4 illustrates a diagram illustrating a process for semantic clustering to suggest semantic labels. Input utterances 407 from speaker(s) 406 are first automatically transcribed as described in. Automated speech recognition module 432 can generate automated transcriptions 435 using language model 436, to provide a set of transcriptions 447. Resulting transcriptions 447 are then clustered using complete linkage clustering. This complete linkage algorithm hierarchically groups the sentences (470) such that the semantic similarity between any two samples in a same cluster is kept to a maximum. The set of clusters present at any point in the clustering hierarchy 470 can be presented to a human labeler as suggested semantic labels 475, and can also be checked for consistency/purity and have a semantic label assigned. Identifying a stopping point in the clustering process is beneficial. The clustering process can be stopped such that the clusters are most helpful to the human labeler. For example, a stopping point can vary depending on a given application. By way of a specific non-limiting example, the clustering process can be stopped when a cluster diameter (lowest semantic similarity between two samples in a cluster) becomes lower than a threshold (e.g. 0.1).

FIG. 6 includes table 600, which illustrates some example sentences that appear in four semantic clusters 602, 604, 606, 608. Note that each cluster includes example sentences that are similar in meaning.

In one embodiment, the training manager receives a first set of sample training sentences for training a text classifier. These sample training sentences requiring semantic labeling. For example, an operator is not sure how to classify a set of sample training data. The training manager identifies multiple different text classifiers trained for classifying text as part of speech recognition applications. Each of the multiple different text classifiers, when executed with a given input sentence, produces a classification label and corresponding classification confidence of the produced classification label for the given input sentence. The training manager labels sentences from the first set of sample training sentences using the multiple different text classifiers. Each of the multiple different text classifiers produces a respective label and classification pairing for each respective sentence from the first set of sample training sentences. The training manager computes a semantic similarity for each labeled sentence from the first set of sample training sentences as compared to other labeled sentences from the first set of sample training sentences. The training manager then uses a complete linkage algorithm to hierarchically group labeled sentences from the first set of sample training sentences based on a predetermined measure of similarity, such that each group within the hierarchy of labeled sentences corresponding to a semantic label.

The training manager can also presents a given sentence from the first set of sample training sentences with at least one available semantic label. This available semantic label corresponds to a group within the hierarchy of labeled sentences. Thus, a human review can then pick and chose from suggested semantic labels, including selecting a number of levels within a hierarchy.

Functionality associated with the training manager will now be discussed via flowcharts and diagrams in FIG. 8 through FIG. 12. For purposes of the following discussion, the training manager 1340 from FIG. 13 or other appropriate entity performs steps in the flowcharts.

Figure 7:
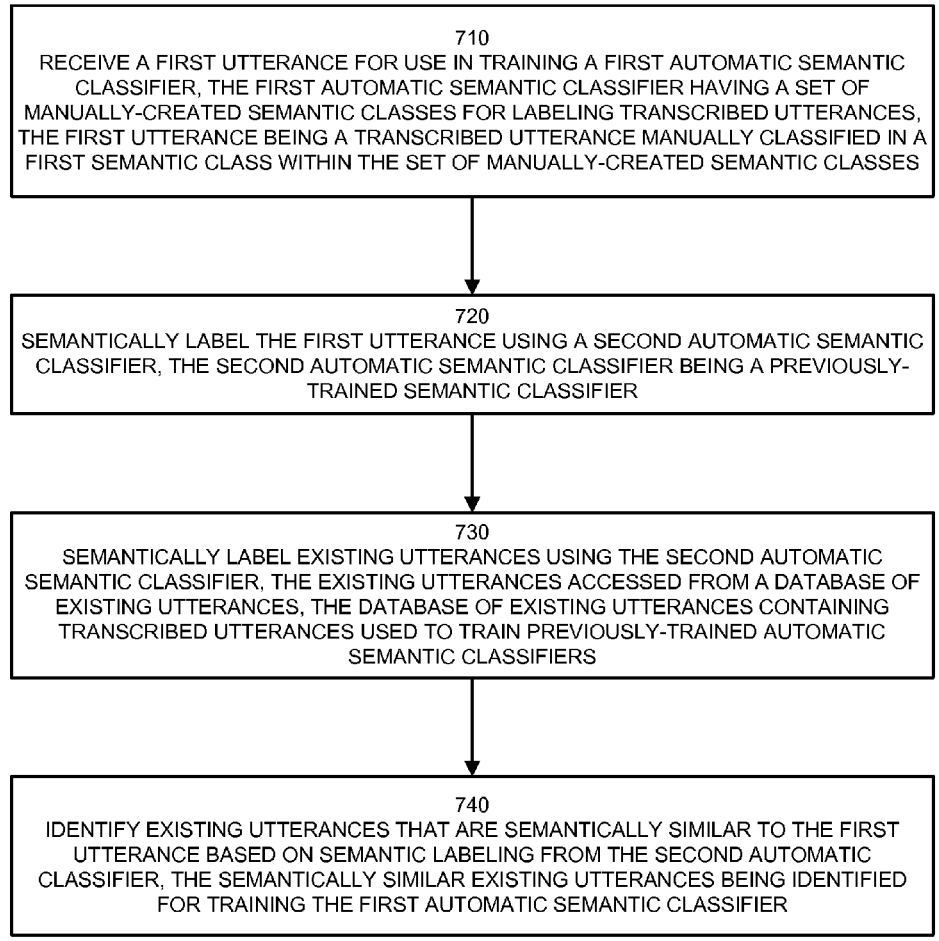
FIG. 7 is a flowchart illustrating an example of a process supporting a training manager according to embodiments herein.

Now describing embodiments more specifically, FIG. 7 is a flow chart illustrating embodiments disclosed herein.

In step 710, training manager 1340 receives a first utterance for use in training a first automatic semantic classifier. The first automatic semantic classifier is associated with a set of manually-created semantic classes for labeling transcribed utterances. For example, the set of manually-created semantic classes can include a list of categories and subcategories for classifying utterances according to meanings. More specifically, and by way of a non-limiting example, such semantic classes can include any of several categories such as: billing, technical support, product inquiry, sales, order status, and so forth. With respect to the example class of billing, subcategories or subclasses could include: billing history, billing changes, electronic funds transfer, billing objections, and so forth. The first utterance is a transcribed utterance manually (or automatically) classified in a first semantic class within the set of manually-created semantic classes. Thus, while utterances, by themselves, can be spoken audio, the automatic semantic classifier operates on transcribed utterances, that is, textual utterances. The set of manually-created semantic classes can be created or designed for a specific company, organization, entity, or call center. For example, an insurance company operates a call center. This insurance company can identify a structure of the call center, types of calls that the call center handles, capacity, and other related organizational and practical information for use as a basis in designing a set of semantic classes for use with call routes. Continuing with the insurance company example, the first utterance for the insurance company might be an insurance-related query such as, "what does my automobile insurance policy cover?"

In step 720, training manager 1340 semantically labels the first utterance using a second automatic semantic classifier. The second automatic semantic classifier is a previously-trained semantic classifier. For example, while the first automatic semantic classifier can be a new or un-trained classifier that needs initial training (or even an existing classifier that needs retraining), the second automatic semantic classifier is an existing semantic classifier, meaning a semantic classifier already trained from textual utterances. The second automatic semantic classifier might be actively used in a call routing application that is online/live, or might be a semantic classifier that is not being actively used for a specific call routing application. In either case, the second automatic semantic classifier has been previously trained.

In step 730, training manager 1340 semantically labels existing utterances using the second automatic semantic classifier. These existing utterances are accessed from a database of existing utterances. The database of existing utterances contains transcribed utterances used to train previously-trained automatic semantic classifiers. Thus, training manager 1340 accesses a pool of existing utterances. These utterances might have been previously used for training various automatic semantic classifiers, that is, semantic classifiers for use in various domains. For example the existing utterances might have been transcribed for training semantic classifiers applied to domains of telecommunication, insurance, medical technology, consumer products, retail sales, etc. Utterances from the existing utterances can have various degrees of overlap to a given domain associated with the first automatic semantic classifier.

In step 740, the training manager 1340 identifies existing utterances that are semantically similar to the first utterance based on semantic labeling from the second automatic semantic classifier. The semantically similar existing utterances are identified for training the first automatic semantic classifier. Thus, the training manager 1340 identifies additional utterances that can be added to a pool of utterances for training the first automatic semantic classifier on how to classify utterances and queries.

Figure 8:
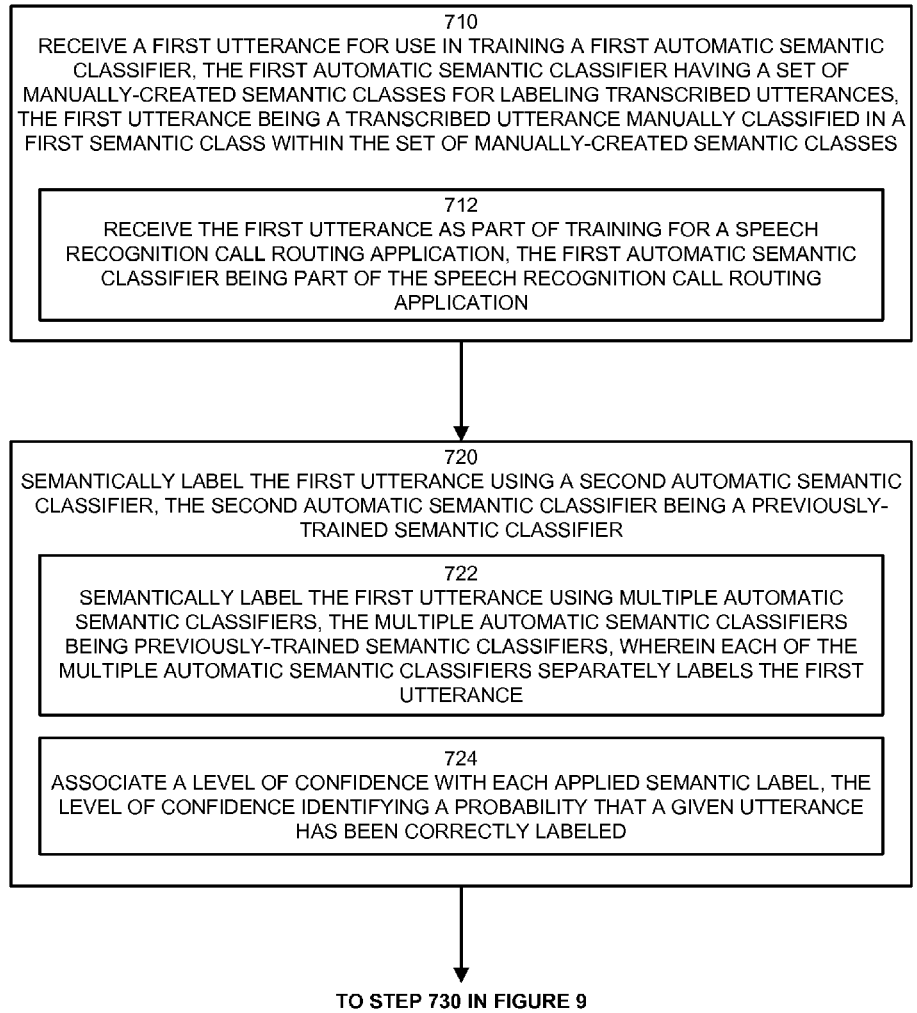
FIGS. 8-9 are a flowchart illustrating an example of a process supporting a training manager according to embodiments herein.
Figure 9:
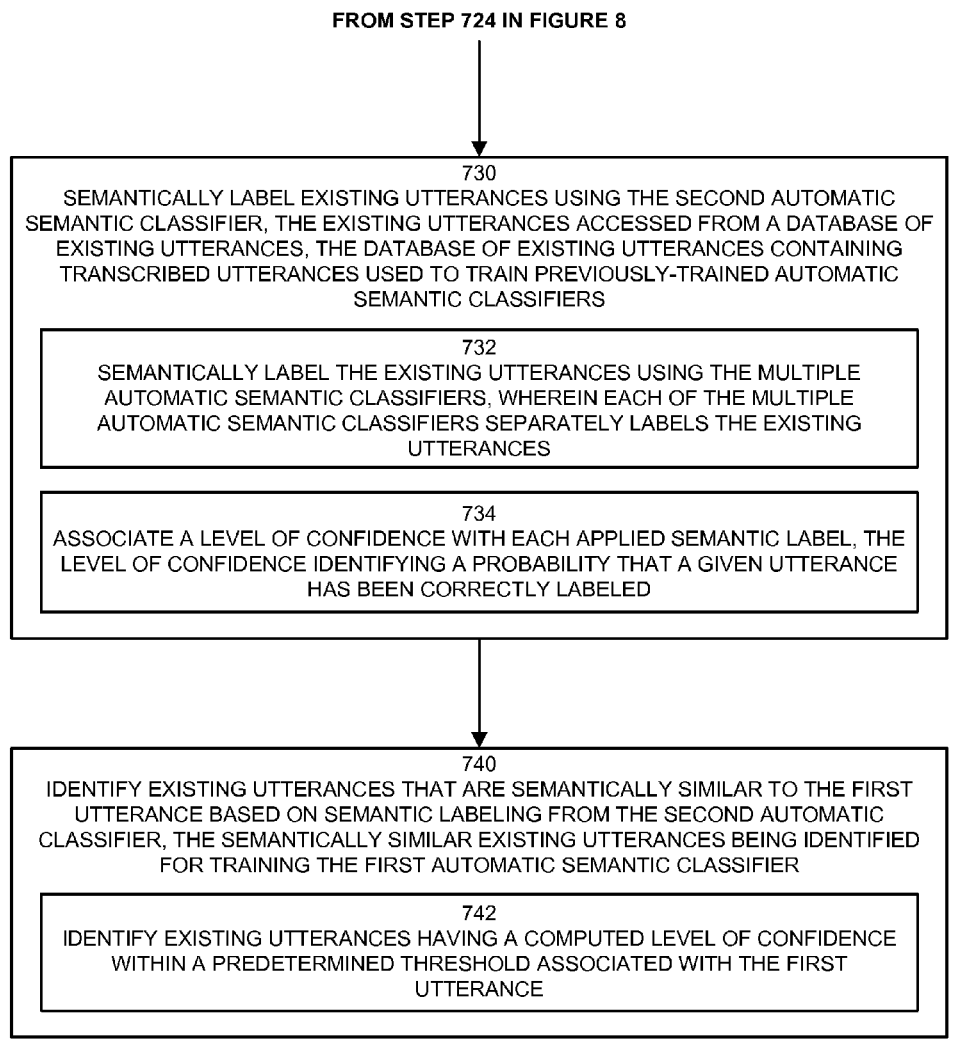

FIGS. 8-9 include a flow chart illustrating additional and/or alternative embodiments and optional functionality as disclosed herein.

In step 710, training manager 1340 receives a first utterance for use in training a first automatic semantic classifier. The first automatic semantic classifier includes (or is associated with) a set of manually-created semantic classes for labeling transcribed utterances. This first utterance can be a transcribed utterance manually classified in a first semantic class within the set of manually created semantic classes, or automatically classified.

In step 712, training manager 1340 receives the first utterance as part of training for a speech recognition call routing application. The first automatic semantic classifier is part of the speech recognition call routing application. Thus, the first utterance can be an example utterance or query that has been received at a call center associated with the first automatic semantic classifier, or as an example utterance expected to be received at the associated call center.

In step 720, training manager 1340 semantically labels the first utterance using a second automatic semantic classifier. The second automatic semantic classifier is a previously-trained semantic classifier.

In step 722, training manager 1340 semantically labels the first utterance using multiple automatic semantic classifiers. The multiple automatic semantic classifiers are previously-trained semantic classifiers. Each of these multiple automatic semantic classifiers separately labels the first utterance. In other words, training manager 1340 can use automatic semantic classifiers from various existing call routing applications. These semantic classifiers can operate in related or unrelated domains. For example, by way of a non-limiting example, the domains associated with the multiple automatic semantic classifiers might include: insurance, medicine, telecommunications, sports, and food. Additionally, training manager 1340 can use any number of semantic classifiers within those domains. For example, training manager 1340 might use four semantic classifiers trained for telecommunication applications, three semantic classifiers trained for medicine applications, seven semantic classifiers trained for food industry applications, and so forth.

In step 724, training manager 1340 associates a level of confidence with each applied semantic label. The level of confidence identifies a probability that a given utterance has been correctly labeled. Each of the multiple automatic semantic classifiers can operate to both assign a semantic label and assign the level of confidence associated with the applied label.

In step 730, training manager 1340 semantically labels existing utterances using the second automatic semantic classifier. The existing utterances are accessed from a database of existing utterances. The database of existing utterances contains transcribed utterances used to train previously-trained automatic semantic classifiers.

In step 732, training manager 1340 semantically labels the existing utterances using the multiple automatic semantic classifiers, in that each of the multiple automatic semantic classifiers separately labels the existing utterances. Thus, the multiple automatic semantic classifiers apply semantic labels to example utterances, submitted with the first or new automatic semantic classifier, as well as existing utterances.

In step 734, training manager 1340 associates a level of confidence with each applied semantic label. This level of confidence identifies a probability that a given utterance has been correctly labeled. Such a probability can be indicated using one or more numerical values.

In step 740, training manager 1340 identifies existing utterances that are semantically similar to the first utterance based on semantic labeling from the second automatic semantic classifier. The semantically similar existing utterances are identified for training the first automatic semantic classifier.

In step 742, training manager 1340 identifies existing utterances having a computed level of confidence within a predetermined threshold associated with the first utterance. Thus, training manager 1340 can adjust confidence thresholds according to user preferences.

Figure 10:
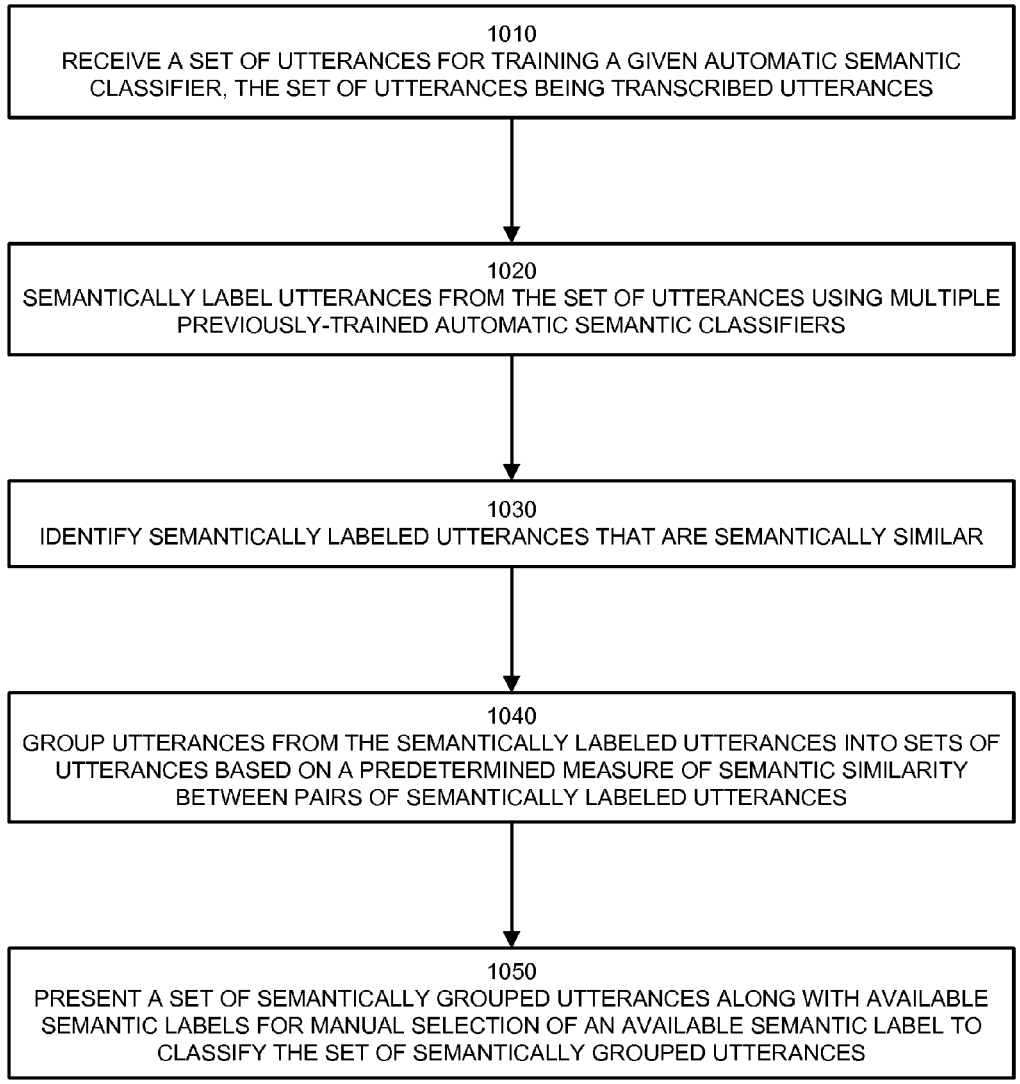
FIG. 10 is a flowchart illustrating an example of a process supporting a training manager according to embodiments herein.

FIG. 10 is a flow chart illustrating additional embodiments disclosed herein.

In step 1010, training manager 1340 receives a set of utterances for training a given automatic semantic classifier. This set of utterances includes transcribed utterances. This set of utterances can include transcribed utterances used to train previously-trained semantic classifiers. The set of utterances can also include new utterances that have not yet been used for training semantic classifiers.

In step 1020, training manager 1340 semantically labels utterances from the set of utterances using multiple previously-trained automatic semantic classifiers. Training manager 1340 can use semantic classifiers from selected or various domains to classify utterances from an aggregate group of textual utterances.

In step 1030, training manager 1340 identifies semantically labeled utterances that are semantically similar. For example, a given utterance can receive different labels or category names from different automatic semantic classifiers, even though the utterance is the same. Training manager 1340 can thus correlate utterances processed and labeled by multiple different automatic semantic classifiers.

In step 1040, training manager 1340 groups utterances from the semantically labeled utterances into one or more sets of utterances based on a measure of semantic similarity between pairs of semantically labeled utterances. Training manager 1340 can compare a given labeled utterance with each labeled utterance from the set of utterances.

In step 1050, training manager 1340 presents a set of semantically grouped utterances, along with one or more available semantic labels, for manual selection of an available semantic label to classify the set of semantically grouped utterances. For example, a user designing a set of categories for a given domain or call routing application can view a graphical user interface to view suggested labels for various groups of utterances.

Figure 11:
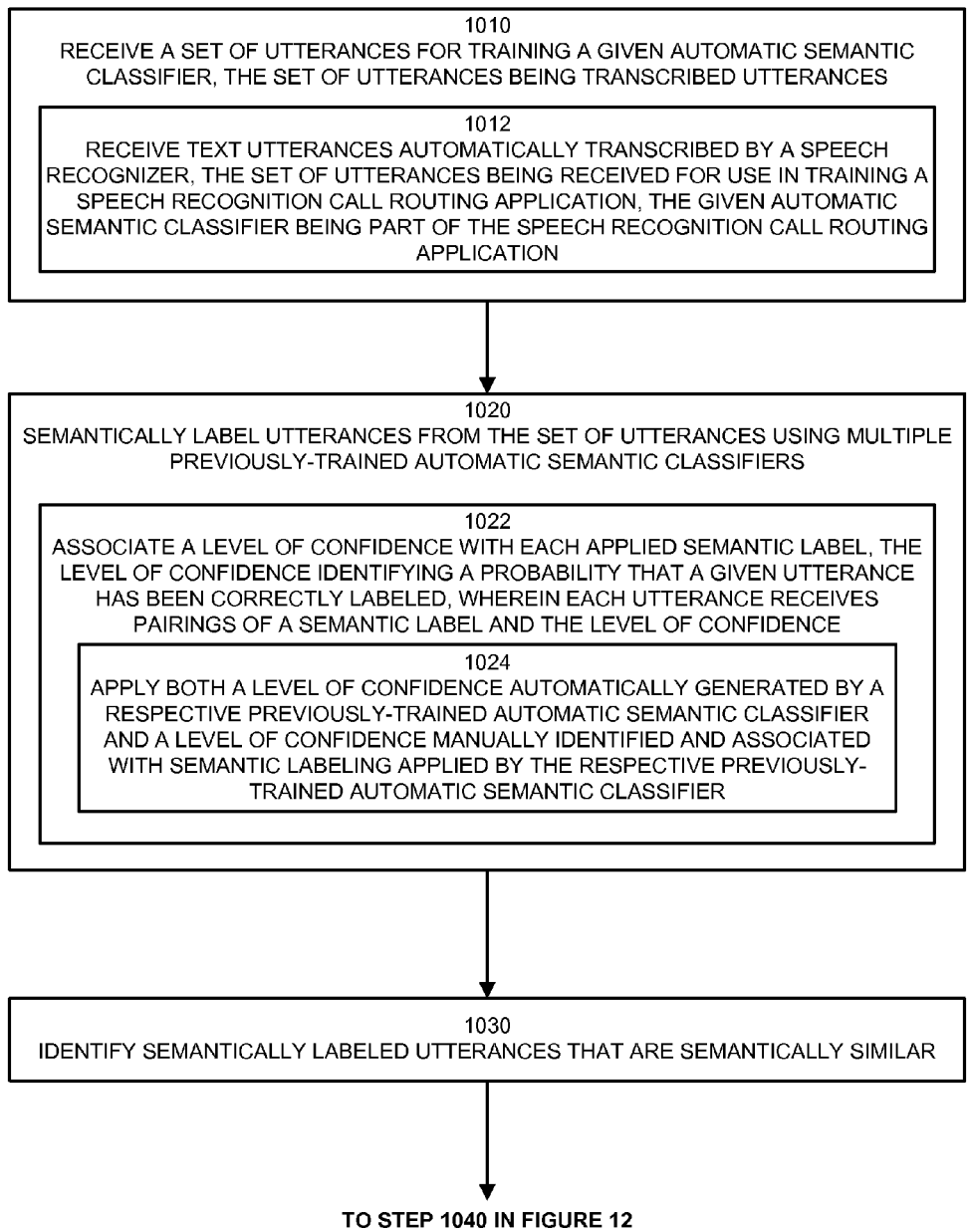
FIGS. 11-12 are a flowchart illustrating an example of a process supporting a training manager according to embodiments herein.
Figure 12:
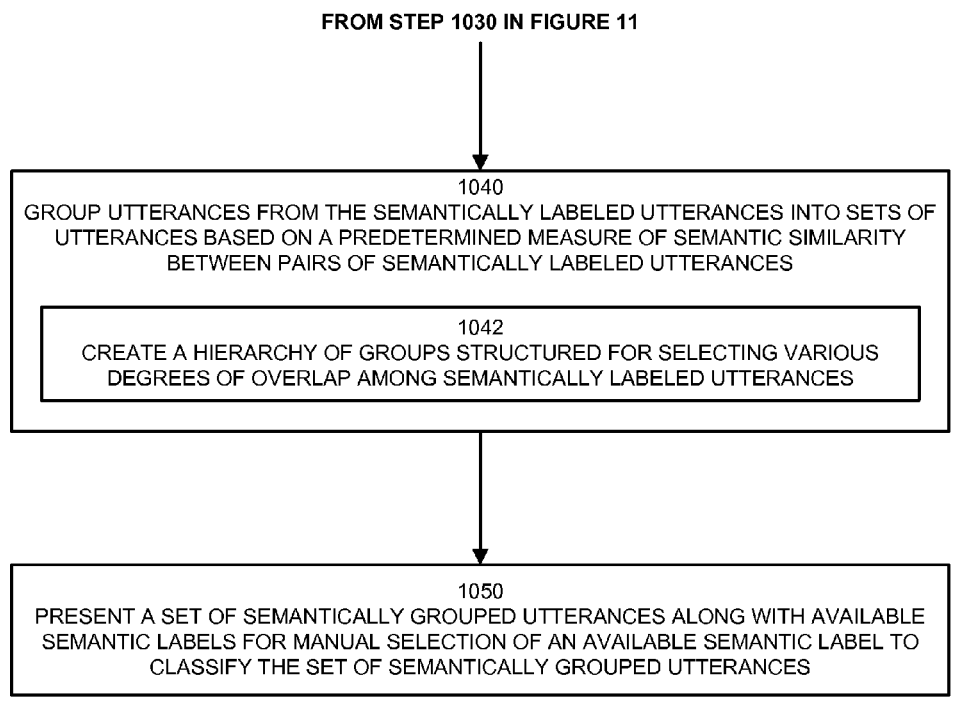

FIGS. 11-12 include a flow chart illustrating additional and/or alternative embodiments and optional functionality as disclosed herein.

In step 1010, training manager 1340 receives a set of utterances for training a given automatic semantic classifier. This set of utterances can be transcribed utterances.

In step 1012, training manager 1340 receives text utterances automatically transcribed by a speech recognizer. This set of utterances is received for use in training a speech recognition call routing application. The given automatic semantic classifier is part of the speech recognition call routing application. Thus, in lieu of receiving manually transcribed utterances, the training manager 1340 can receive these text utterances from one or more speech recognizers. A speech recognizer converts spoken utterances to text, while a semantic classifier identifies a meaning of a given transcribed utterance.

In step 1020, training manager 1340 semantically labels utterances from the set of utterances using multiple previously-trained automatic semantic classifiers.

In step 1022, training manager 1340 associates a level of confidence with each applied semantic label. The level of confidence identifies probability that a given utterance has been correctly labeled. Each utterance receives one or more pairings of a semantic label and the level of confidence.

In step 1024, training manager 1340 applies both a level of confidence automatically generated by a respective previously-trained automatic semantic classifier and the level of confidence manually identified and associated with semantic labeling applied by the respective previously-trained automatic semantic classifier. For example, a given semantic classifier can have an observed level of confidence or accuracy different from confidence levels automatically applied. Training manager 1340 can thus combine observed levels of confidence with automatically generated levels of confidence. More specifically, training manager 1340 can use the product of two or more confidences to more accurately identify a level of confidence.

In step 1030, training manager 1340 identifies semantically labeled utterances that are semantically similar.

In step 1040, training manager 1340 groups utterances from the semantically labeled utterances into one or more sets of utterances based on a measure of semantic similarity between pairs of semantically labeled utterances.

In step 1042, training manager 1340 creates a hierarchy of groups structured for selecting various degrees of overlap among semantically labeled utterances. For example, a given call center application may be relatively small or relatively large. Generally, call centers that are relatively large tend to have specialized customer service representatives that only handle specific types of queries. Such relatively large call centers might need multiple levels of categories or classes for proper call routing. Conversely, a relatively smaller call center might have customer service representatives that handle general inquiries across multiple categories or topics, and thus a hierarchical set of classes might not be needed. Training manager 1340 can therefore selectively display various levels or hierarchies of semantically labeled utterances.

In step 1050, training manager 1340 presents a set of semantically grouped utterances, along with one or more available semantic labels, for manual selection of an available semantic label to classify the set of semantically grouped utterances. Such presentation can help a transcriber or developer to create a set of classes in a shorter amount of time.

Figure 13:
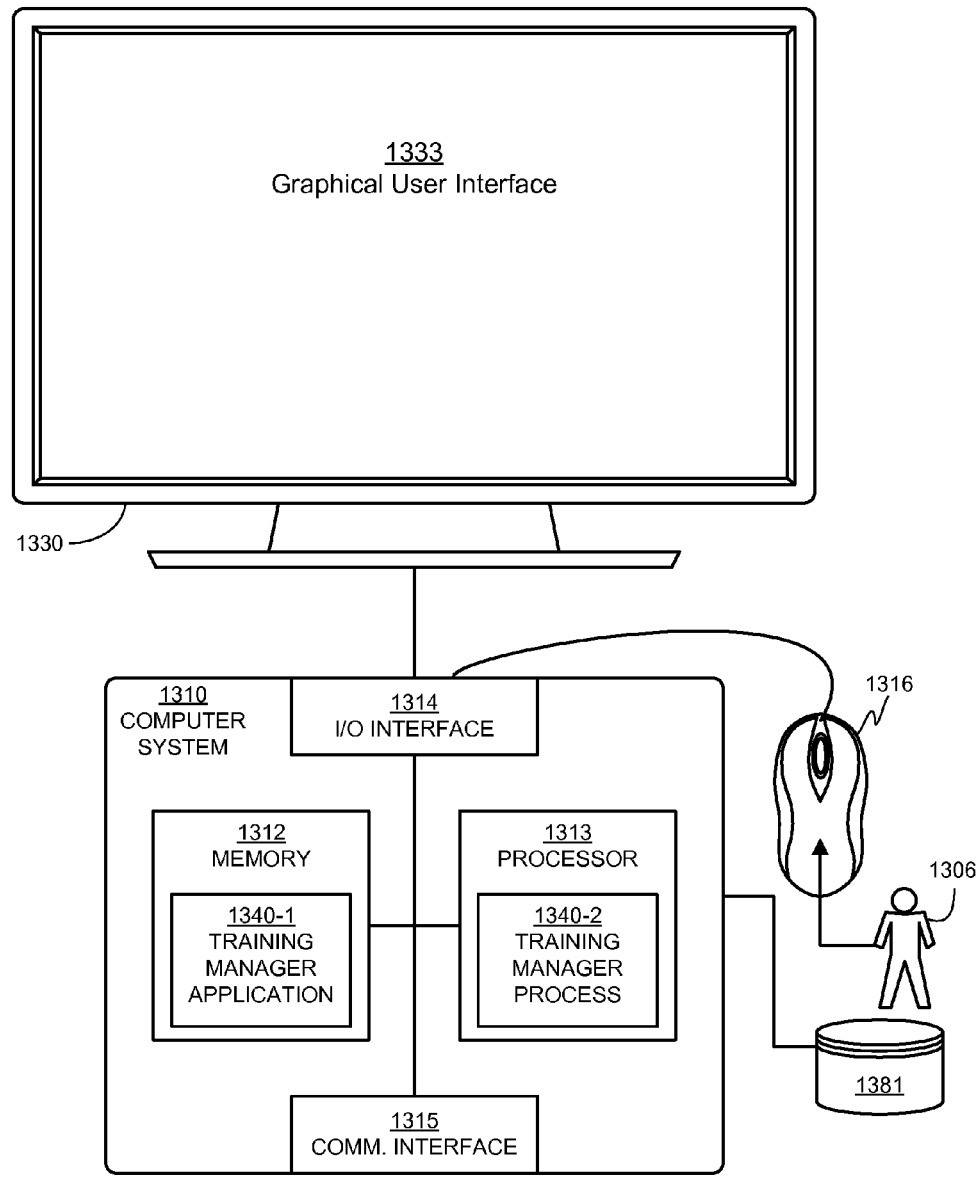
FIG. 13 is an example block diagram of a training manager operating in a computer/network environment according to embodiments herein.

Now referring to FIG. 13, the following discussion provides a basic embodiment indicating how to carry out functionality associated with the training manager 1340 as discussed above. It should be noted, however, that the actual configuration for carrying out the training manager 1340 can vary depending on a respective application. For example, computer system 1310 can include one or multiple computers that carry out the processing as described herein.

In different embodiments, computer system 1310 may be any of various types of devices, including, but not limited to, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

Computer system 1310 is shown connected to display monitor 1330 for displaying a graphical user interface 1333 for a user 1306 to operate using input devices 1316. Repository 1381 can optionally be used for storing data files and content both before and after processing. Input devices 1316 can include one or more devices such as a keyboard, computer mouse, etc.

As shown, computer system 1310 of the present example includes an interconnect 1311 that couples a memory system 1312, a processor 1313, I/O interface 1314, and a communications interface 1315.

I/O interface 1314 provides connectivity to peripheral devices such as input devices 1316 including a computer mouse, a keyboard, a selection tool to move a cursor, display screen, etc.

Communications interface 1315 enables the training manager 1340 of computer system 1310 to communicate over a network and, if necessary, retrieve any data required to create views, process content, communicate with a user, etc. according to embodiments herein.

As shown, memory system 1312 is encoded with training manager 1340-1 that supports functionality as discussed above and as discussed further below. Training manager 1340-1 (and/or other resources as described herein) can be embodied as software code such as data and/or logic instructions that supports processing functionality according to different embodiments described herein.

During operation of one embodiment, processor 1313 accesses memory system 1312 via the use of interconnect 1311 in order to launch, run, execute, interpret or otherwise perform the logic instructions of the training manager 1340-1. Execution of the training manager 1340-1 produces processing functionality in training manager process 1340-2. In other words, the training manager process 1340-2 represents one or more portions of the training manager 1340 performing within or upon the processor 1313 in the computer system 1310.

It should be noted that, in addition to the training manager process 1340-2 that carries out method operations as discussed herein, other embodiments herein include the training manager 1340-1 itself (i.e., the un-executed or non-performing logic instructions and/or data). The training manager 1340-1 may be stored on a non-transitory, tangible computer-readable storage medium including computer readable storage media such as floppy disk, hard disk, optical medium, etc. According to other embodiments, the training manager 1340-1 can also be stored in a memory type system such as in firmware, read only memory (ROM), or, as in this example, as executable code within the memory system 1312.

In addition to these embodiments, it should also be noted that other embodiments herein include the execution of the training manager 1340-1 in processor 1313 as the training manager process 1340-2. Thus, those skilled in the art will understand that the computer system 1310 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method of semantic classification, the computer-implemented method comprising:
receiving, at a computerized training manager, a first utterance for use in training a first computerized semantic classifier, the first computerized semantic classifier having a set of manually-created semantic classes for labeling transcribed utterances, the first utterance being a transcribed utterance manually classified in a first semantic class within the set of manually-created semantic classes;
semantically labeling the first utterance by a second computerized semantic classifier, the second computerized semantic classifier being a previously-trained computerized semantic classifier;
semantically labeling existing utterances by the second computerized semantic classifier, the existing utterances accessed from a database of existing utterances, the database of existing utterances containing transcribed utterances used to train previously-trained computerized semantic classifiers;
identifying, by the computerized training manager, existing utterances that are semantically similar to the first utterance based on semantic labeling from the second computerized semantic classifier; and
training, by the computerized training manager, the first computerized semantic classifier using the semantically similar existing utterances.

2. The computer-implemented method of claim 1, further comprising:
semantically labeling the first utterance by multiple computerized semantic classifiers, the multiple computerized semantic classifiers being previously-trained computerized semantic classifiers, wherein each of the multiple computerized semantic classifiers separately labels the first utterance; and
semantically labeling the existing utterances by the multiple computerized semantic classifiers, wherein each of the multiple computerized semantic classifiers separately labels the existing utterances.

3. The computer-implemented method of claim 1, wherein semantically labeling the first utterance and semantically labeling the existing utterances includes associating, by the multiple computerized semantic classifiers, a level of confidence with each applied semantic label, the level of confidence identifying a probability that a given utterance has been correctly labeled.

4. The computer-implemented method of claim 3, wherein identifying existing utterances that are semantically similar includes identifying, by the computerized training manager, existing utterances having a computed level of confidence within a predetermined threshold associated with the first utterance.

5. The computer-implemented method of claim 1, wherein receiving the first utterance for use in training the first computerized semantic classifier includes receiving, at the computerized training manager, the first utterance as part of training for a speech recognition call routing application, the first computerized semantic classifier being part of the speech recognition call routing application.

6. A computer system for semantic classification, the computer system comprising:
a processor; and
a memory coupled to the processor, the memory storing instructions that when executed by the processor cause the system to perform the operations of:

receiving a first utterance for use in training a first automatic semantic classifier, the first automatic semantic classifier having a set of semantic classes for labeling transcribed utterances, the first utterance being a transcribed utterance classified in a first semantic class within the set of semantic classes;
semantically labeling the first utterance using a second automatic semantic classifier, the second automatic semantic classifier being a previously-trained semantic classifier;
semantically labeling existing utterances using the second automatic semantic classifier, the existing utterances accessed from a database of existing utterances, the database of existing utterances containing transcribed utterances used to train previously-trained automatic semantic classifiers;
identifying existing utterances that are semantically similar to the first utterance based on semantic labeling from the second automatic classifier; and
training the first automatic semantic classifier using the semantically similar existing utterances.

7. The computer system of claim 6, wherein the memory stores further instructions that when executed by the processor cause the system to perform the operations of:
semantically labeling the first utterance using multiple automatic semantic classifiers, the multiple automatic semantic classifiers being previously-trained semantic classifiers, wherein each of the multiple automatic semantic classifiers separately labels the first utterance; and
semantically labeling the existing utterances using the multiple automatic semantic classifiers, wherein each of the multiple automatic semantic classifiers separately labels the existing utterances.

8. The computer system of claim 6, wherein semantically labeling the first utterance and semantically labeling the existing utterances includes associating a level of confidence with each applied semantic label, the level of confidence identifying a probability that a given utterance has been correctly labeled.

9. The computer system of claim 8, wherein identifying existing utterances that are semantically similar includes identifying existing utterances having a computed level of confidence within a predetermined threshold associated with the first utterance.

10. The computer system of claim 6, wherein receiving the first utterance for use in training the first automatic semantic classifier includes receiving the first utterance as part of training for a speech recognition call routing application, the first automatic semantic classifier being part of the speech recognition call routing application.

11. A computer-implemented method of semantic classification, the computer-implemented method comprising:
receiving, at a computerized training manager, a set of utterances for training a given computerized semantic classifier, the set of utterances being transcribed utterances;
semantically labeling utterances from the set of utterances by multiple previously-trained computerized semantic classifiers;
identifying, by the computerized training manager, semantically labeled utterances that are semantically similar;
grouping, by the computerized training manager, utterances from the semantically labeled utterances into sets of utterances based on a predetermined measure of semantic similarity between pairs of semantically labeled utterances;

presenting, by the computerized training manager, a given utterance from the set of utterances along with available semantic labels for manual selection of an available semantic label to classify a given set of semantically grouped utterances; and training, by the computerized training manager, the given computerized semantic classifier using the classified given set of semantically grouped utterances.

12. The computer-implemented method of claim 11, wherein semantically labeling utterances includes associating, by the multiple previously-trained computerized semantic classifiers, a level of confidence with each applied semantic label, the level of confidence identifying a probability that a given utterance has been correctly labeled, wherein each utterance receives pairings of a semantic label and the level of confidence.

13. The computer-implemented method of claim 12, wherein associating the level of confidence with each applied semantic label includes applying, by the multiple previously-trained computerized semantic classifiers, both a level of confidence automatically generated by a respective previously-trained computerized semantic classifier and a level of confidence manually identified and associated with semantic labeling applied by the respective previously-trained computerized semantic classifier.

14. The computer-implemented method of claim 11, wherein grouping utterances from the semantically labeled utterances includes creating, by the computerized training manager, a hierarchy of groups structured for selecting various degrees of overlap among semantically labeled utterances.

15. The computer-implemented method of claim 11, wherein receiving the set of utterances includes receiving, at the computerized training manager, text utterances automatically transcribed by a speech recognizer, the set of utterances being received for use in training a speech recognition call routing application, the given computerized semantic classifier being part of the speech recognition call routing application.

16. A computer system for semantic classification, the computer system comprising:
    a processor; and
    a memory coupled to the processor, the memory storing instructions that when executed by the processor cause the system to perform the operations of:
        receiving a set of utterances for training a given automatic semantic classifier, the set of utterances being transcribed utterances;
        semantically labeling utterances from the set of utterances using multiple previously-trained automatic semantic classifiers;
        identifying semantically labeled utterances that are semantically similar;
        grouping utterances from the semantically labeled utterances into sets of utterances based on a measure of semantic similarity between pairs of semantically labeled utterances;
        presenting a given utterance from the set of utterances along with available semantic labels for manual selection of an available semantic label to classify a given set of semantically grouped utterances; and
        training the given automatic semantic classifier using the classified given set of semantically grouped utterances.

17. The computer system of claim 16, wherein the memory further stores instructions that when executed by the processor cause the system to perform the operation of:

presenting a set of semantically grouped utterances along with available semantic labels for manual selection of an available semantic label to classify the given set of semantically grouped utterances; and wherein semantically labeling utterances includes associating a level of confidence with each applied semantic label, the level of confidence identifying a probability that a given utterance has been correctly labeled, wherein each utterance receives pairings of a semantic label and the level of confidence.

18. The computer system of claim 17, wherein associating the level of confidence with each applied semantic label includes applying both a level of confidence automatically generated by a respective previously-trained automatic semantic classifier and a level of confidence manually identified and associated with semantic labeling applied by the respective previously-trained automatic semantic classifier.

19. The computer system of claim 16, wherein grouping utterances from the semantically labeled utterances includes creating a hierarchy of groups structured for selecting various degrees of overlap among semantically labeled utterances.

20. The computer system of claim 16, wherein receiving the set of utterances includes receiving text utterances automatically transcribed by a speech recognizer, the set of utterances being received for use in training a speech recognition call routing application, the given automatic semantic classifier being part of the speech recognition call routing application.

21. A computer-implemented method of semantic classification, the computer-implemented method comprising:
    labeling sentences from a first group of sentences by multiple different computerized text classifiers to produce a label and produce a classification confidence corresponding to the produced label, wherein each of the multiple different computerized text classifiers produces a respective label and classification pairing for each respective sentence from the first group of sentences, the first group of sentences including sentences collected from sample sentences used for training existing text classifiers used with speech recognition applications, the label representing a sentence meaning;
    labeling sentences from a second group of sentences by the multiple different computerized text classifiers to produce a label and produce a classification confidence corresponding to the produced label, wherein each of the multiple different computerized text classifiers produces a respective label and classification pairing for each respective sentence from the second group of sentences, the second group of sentences including sentences collected from sample training sentences for training a new computerized text classifier used with a speech recognition application;
    computing, by a computerized training manager, a semantic similarity for each labeled sentence from the second group of sentences as compared to each labeled sentence from the first group of sentences;
    identifying, by the computerized training manager, labeled sentences from the first group of sentences that meet a predetermined measure of similarity to each given labeled sentence from the second group of sentences;
    grouping, by the computerized training manager, identified labeled sentences from the first group of sentences with corresponding sentences from the second group of sentences based on the predetermined measure of similarity; and
    training, by the computerized training manager, the new text classifier used with the speech recognition application using identified labeled sentences from the first group of sentences and sentences from a second group of sentences, the speech recognition application being a call routing application.

22. A computer-implemented method of semantic classification, the computer-implemented method comprising:
receiving, at a computerized training manager, a first set of semantic labels;
receiving, at a computerized training manager, a first set of sentences that includes at least one sample sentence for each semantic label from the first set of semantic labels;
creating, by the computerized training manager, a database of sentences that includes sentences used as training sentences to train text classifiers used with speech recognition applications;
identifying, by the computerized training manager, multiple different computerized text classifiers trained for classifying text as part of speech recognition applications, each of multiple different computerized text classifiers, when executed with a given input sentence, produces a semantic classification label and corresponding classification confidence of the produced semantic classification label for the given input sentence;
semantically labeling sentences from the database of sentences by the multiple different computerized text classifiers, wherein each of the multiple different computerized text classifiers produces a respective semantic label and classification pairing for each respective sentence from the database of sentences;
semantically labeling sentences from the first set of sentences by the multiple different computerized text classifiers, wherein each of the multiple different computerized text classifiers produces a respective semantic label and classification pairing for each respective sentence from the first set of sentences;
computing, by the computerized training manager, a semantic similarity for each semantically labeled sentence from the first group of sentences as compared to each semantically labeled sentence from the database of sentences;
for each semantically labeled sentence from the first set of sentences, identifying, by the computerized training manager, semantically labeled sentences from the database of sentences that meet a predetermined measure of similarity;
adding, by the computerized training manager, the identified semantically labeled sentences from the database of sentences as sample sentences to the first set of sentences according to the computed semantic similarity and the first set of semantic labels; and
training, by the computerized training manager, a statistical language model according to the first set of semantic labels using the identified semantically labeled sentences from the database of sentences and the first set of sentences.

23. A computer-implemented method of semantic classification, the computer-implemented method comprising:
receiving, at a computerised training manner, a first set of sample training sentences for training a text classifier, the sample training sentences requiring semantic labeling;
identifying, by the computerized training manager, multiple different computerized text classifiers trained for classifying text as part of speech recognition applications, each of multiple different computerized text classifiers, when executed with a given input sentence, produces a semantic classification label and corresponding classification confidence of the produced classification label for the given input sentence;
labeling sentences from the first set of sample training sentences by the multiple different computerized text classifiers, wherein each of the multiple different computerized text classifiers produces a respective semantic label and classification pairing for each respective sentence from the first set of sample training sentences;
computing, by the computerized training manager, a semantic similarity for each labeled sentence from the first set of sample training sentences as compared to other labeled sentences from the first set of sample training sentences;
hierarchically grouping, by the computerized training manager, labeled sentences from the first set of sample training sentences using a complete linkage algorithm based on a predetermined measure of similarity, each group within the hierarchy of labeled sentences corresponding to a semantic label;
presenting, by the computerized training manager, a given sentence from the first set of sample training sentences with at least one available semantic label, the at least one available semantic label corresponding to a group within the hierarchy or labeled sentences; and
training, by the computerized training manager, the text classifier using the group within the hierarchy of labeled sentences.

\* \* \* \* \*